E. G. CLYMANS.
GRAIN SEPARATOR.
APPLICATION FILED JULY 27, 1908.
928,498.
Patented July 20, 1909.
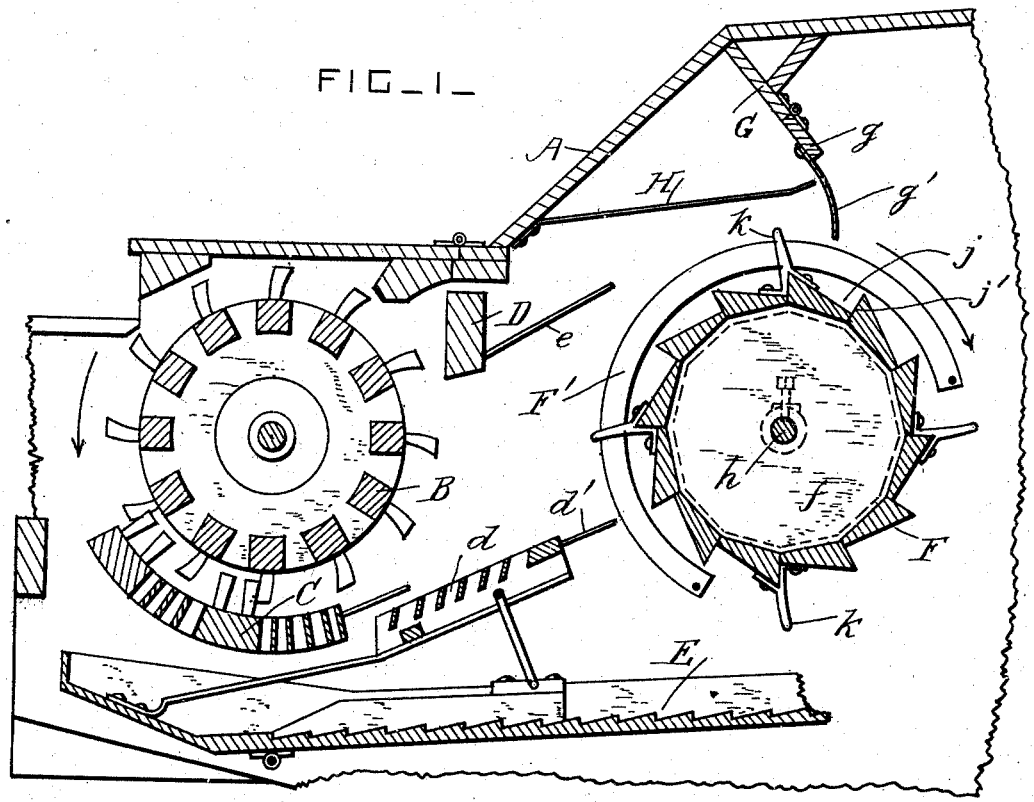
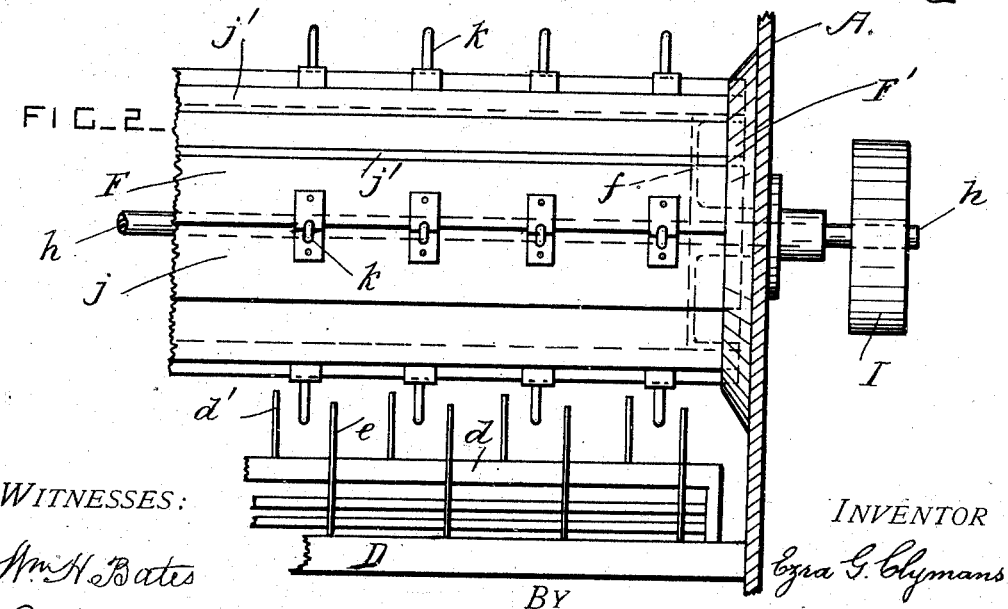
WITNESSES:
Wm H Bates
E H Bond
INVENTOR
Ezra G. Clymans
BY
Herbert W Jenner.
Attorney

UNITED STATES PATENT OFFICE.

EZRA G. CLYMANS, OF WAYNESBORO, PENNSYLVANIA, ASSIGNOR TO THE GEISER MANUFACTURING COMPANY, OF WAYNESBORO, PENNSYLVANIA.

GRAIN-SEPARATOR.

No. 928,498. Specification of Letters Patent. Patented July 20, 1909.

Application filed July 27, 1908. Serial No. 445,645.

*To all whom it may concern:*

Be it known that I, EZRA G. CLYMANS, a citizen of the United States, residing at Waynesboro, in the county of Franklin and State of Pennsylvania, have invented certain new and useful Improvements in Grain-Separators; and I do hereby declare the following to be a full, clear, and exact description of the invention, such as will enable others skilled in the art to which it appertains to make and use the same.

This invention relates to devices for separating the grain from the straw in a threshing machine and it consists of a novel straw-carrying reel or drum arranged next behind the threshing mechanism and constructed as hereinafter fully described and claimed.

In the drawings, Figure 1 is a longitudinal section through a portion of the threshing-machine showing the separating devices constructed according to this invention. Fig. 2 is a plan view of portions of the reel or drum and the straw-guides.

A is a portion of the casing of a threshing-machine or grain-separator of any approved construction.

B is the threshing cylinder, and C is the toothed concave.

D is a crossbar arranged behind the upper part of the cylinder B, and $d$ is a grate and straw-guide below the cross-bar D.

E is a portion of a grain-pan extending longitudinally under all the said parts. These parts are all of any approved construction. The grain is threshed out between the cylinder and concave, and the straw and grain are driven rearwardly in a stream between the parts D and $d$.

F is a revoluble reel or drum journaled in the casing with its upper half arranged directly in the path of the stream of straw as it comes from the threshing mechanism. The grate $d$ may have open or closed slats at its rear part, and it has a series of teeth $d'$ at its read end for guiding the straw. These teeth $d'$ are arranged substantially radial of the drum F. The crossbar D also has a series of teeth $e$ for guiding the straw, which project upwardly and rearwardly from the said crossbar.

F' are shields secured to the sides of the casing around the end of the drum to prevent straw from catching between them.

G is a deflector for the grain secured to the casing over the drum F, and provided with a hinged flap $g$ at its lower edge. A curtain $g'$ of flexible material depends from the flap $g$ in the path of the straw which is carried over the top of the drum.

H are rearwardly and upwardly projecting fingers of spring metal secured to the casing over the drum F and in front of the deflector G. These fingers H operate to press the straw downward onto the periphery of the drum F.

The drum F is preferably formed of a series of slats secured to two heads $f$, which are secured to a drum-shaft $h$ by any approved fastening devices. The drum-shaft $h$ is provided with a belt-pulley I for revolving it in the direction of the arrow in Fig. 1, but any approved driving mechanism may be provided for revolving the said drum provided it is driven in the opposite direction from the threshing cylinder B. The slats forming the periphery of the drum are arranged so as to form a series of pockets $j$. The slats form an imperforate surface at the periphery of the drum, so that no grain or straw passes into or through the drum. The rear sides $j'$ of the pockets are substantially radial of the drum-shaft, and the bottoms of the pockets are arranged at substantially a right-angle to their rear sides, so that the drum appears like a ratchet-toothed wheel in cross-section. Teeth $k$ project radially from the periphery of the drum, and are arranged in rows.

The stream of straw from the threshing mechanism is directed by the straw-guides or teeth against the upper half of the drum F. Some of the flying grain passes between the lower guide teeth and is deflected into the grain-pan by contact with the lower part of the drum. The grain remaining in the stream of straw strikes the upper part of the drum, and some of it is deflected and the remainder is caught in the pockets of the drum. The tops of the rear sides of the pockets support the straw in its passage over the drum, so that the pockets form spaces under the straw in which the grain may lodge and be carried over the top of the drum. The grain falls from the pockets at the rear side of the drum into the grain-pan, and the straw is discharged separate from the grain at the rear of the drum, and passes onto straw-racks or shakers of approved construction, which are not shown in the drawings.

What I claim is:

1. In a grain separator, the combination, with a revoluble threshing cylinder and its concave, of a drum journaled behind the said threshing cylinder and provided with a series of angle-shaped pockets having relatively short rear sides arranged substantially radial of the drum, means for revolving the said drum in the opposite direction to the said threshing cylinder, spring deflecting-fingers for the straw arranged in front of and over the front part of the said drum, and guides for directing the straw from the threshing cylinder against the upper part of the said drum.

2. In a grain separator, the combination, with a revoluble threshing cylinder and its concave, of a drum journaled behind the said threshing cylinder and provided with a series of angle-shaped pockets having relatively short rear sides arranged substantially radial of the drum, means for revolving the said drum in the opposite direction to the said threshing cylinder, rows of straw-carrying teeth projecting from the periphery of the said drum, and guides for directing the straw from the threshing cylinder against the upper part of the said drum.

3. In a grain separator, the combination, with a revoluble threshing cylinder and its concave, of a drum journaled behind the said cylinder and comprising heads and a series of slats secured around the said heads and forming angle-shaped pockets having relatively short rear sides, rows of teeth secured to the said slats and projecting radially at the rear sides of the said pockets, means for revolving the said drum in the opposite direction from the cylinder, and guides for directing the straw from the cylinder against the upper part of the said drum.

In testimony whereof I have affixed my signature in the presence of two witnesses.

EZRA G. CLYMANS.

Witnesses:
 ANDREW M. HESS,
 ALF. N. RUSSELL.